United States Patent [19]
Asrar

[11] Patent Number: 5,049,632
[45] Date of Patent: Sep. 17, 1991

[54] N-CYCLOALKYL NORBORNENE DICARBOXIMIDE POLYMERS

[75] Inventor: Jawed Asrar, Chesterfield, Mo.

[73] Assignee: Monsanto Company, St. Louis, Mo.

[21] Appl. No.: 629,884

[22] Filed: Dec. 19, 1990

[51] Int. Cl.$^5$ ............... C08F 122/40; C08F 126/06; C08F 271/02
[52] U.S. Cl. .................................. 526/262; 526/259; 525/279
[58] Field of Search ........................... 526/262

[56] References Cited
U.S. PATENT DOCUMENTS 3,959,234  5/1976  Kurosawa et al. ............... 260/78
4,022,954  5/1977  Kurosawa et al. ............... 526/15
4,965,330  10/1990  Asrar ................................. 526/259

FOREIGN PATENT DOCUMENTS 1594934  9/1970  France .

OTHER PUBLICATIONS

K. F. Castner and N. Calderon, "Journal of Molecular Catalysis", 15 (1982), 47–59.
C. J. Hardiman, "Metathesis Polymerization Catalyst", (U.S. Ser. No. 07/531,663).
J. Asrar, "Norbornene Dicarboximide Polymers", (U.S. Ser. No. 07/196,992).

Primary Examiner—Joseph L. Schofer
Assistant Examiner—Wu C. Cheng
Attorney, Agent, or Firm—Thomas E. Kelley; Richard H. Shear

[57] ABSTRACT

Polymers of N-cycloalkyl norbornene dicarboximides exhibit high glass transition temperature, low moisture pickup and low dielectric permittivity. Poly(N-cyclohexyl norbornene dicarboximide) has a Tg of 280° C., dielectric constant of about 2.5 and boiling water equilibrated weight gain of only about 2%. Monomers have melting point less than 150° C. and are advantageously prepared by melt polymerization with conventional metathesis ring-opening polymerization catalysts.

8 Claims, No Drawings

N-CYCLOALKYL NORBORNENE DICARBOXIMIDE POLYMERS

Disclosed herein are novel polymers of N-cycloalkyl norbornene dicarboximide exhibiting advantageously high heat resistance and low dielectric constant and low moisture absorption. Also disclosed are methods of making and using such polymers.

BACKGROUND OF THE INVENTION

High temperature resistant polymers, e.g. as measured by heat distortion temperature and/or glass transition temperature (Tg), are especially useful for a variety of high value, high performance applications. Among the polymers which commonly find use in such applications are thermoset polymers such as epoxy, phenolic and imide polymers. For many applications thermoplastic polymers having high performance temperature such as polyetherimides, polyetherketones, ploysulfones and polyamideimides are preferred because they are processable into articles by conventional thermoplastic molding methods. However, such high performance temperature thermoplastic polymers are typically characterized by one or more disadvantageous properties such as high cost arising from complex preparation methods, high dielectric permittivity, high moisture absorption. Despite their inherent disadvantages the high performance temperature thermoplastic polymers are materials for choice for many applications.

French Brevet d'invention 1,594,934 and U.S. Pat. No. 3,959,234 disclose a variety of norbornene dicarboximide polymers exhibiting a wide range of Tg from −172° C. to 189° C. depending on the hydrocarbon radical forming the imide group as indicated in the following Table 1.

TABLE 1

| Imide Group Radical | Tg, °C. |
|---|---|
| methyl | 185/189 |
| ethyl | 169 |
| n-propyl | 149 |
| iso-propyl | 180 |
| n-butyl | 149 |
| t-butyl | 177 |
| n-hexyl | 40 |
| n-octyl | −32 |
| n-decyl | −43 |
| cyclohexyl | −172 |
| benzyl | 152 |
| phenyl | 162/166 |

High performance temperature thermoplastic polymers of N-methyl norbornene dicarboximide polymers having a Tg greater than 200° C. are disclosed in my prior United States application Ser. No. 07/196,992. Polymers of N-methyl norbornene dicarboximide can be simply prepared, e.g. by melt polymerization using conventional metathesis polymerization catalysts, and exhibit favorable dielectric permittivity, e.g., about 3.1 after equilibrating in room temperature air at 50% relative humidity. However, they exhibit disadvantageously high moisture absorption, e.g. more than 6% weight gain after equilibrating in boiling water for 7 hours.

Other high performance temperature thermoplastic polymers of N-phenyl norbornene dicarboximide polymers having a Tg greater than 200° C. are disclosed by me in U.S. Pat. No. 4,965,330. Although polymers of N-phenyl norbornene dicarboximides exhibit low moisture absorption, e.g. about 3% after equilibrating in boiling water, they unfortunately are not as simple to prepare, e.g. the precursor monomer is not amenable to melt polymerization because it has a high melt temperature. Preparation of the polymer by solution polymerization, e.g. in chlorinated hydrocarbon solvents, is undesirable because of cost and environmental burdens.

An object of this invention is to provide a novel high temperature performance polymers that can be prepared by simple polymerization methods, i.e. melt polymerization, and that exhibit desirably low dielectric permittivity and moisture absorption.

SUMMARY OF THE INVENTION

This invention provides novel polymers comprising N-cycloalkyl norbornene dicarboximide units where the cycloalkyl radical ranges from 3–8 carbon atoms, i.e. cyclopropyl to cyclooctyl. Because the N-cycloalkyl norbornene dicarboximide monomers have a melt point less than 150° C., the polymers of this invention are advantageously prepared by melt polymerization using conventional metathesis polymerization catalysts. The polymers of this invention exhibit desirably high heat resistance, e.g. Tg's of at least 180° C., low dielectric permittivity, e.g. less than 3, and low moisture absorption, e.g. less than 2.5 % weight increase after equilibrating in boiling water.

DESCRIPTION OF PREFERRED EMBODIMENTS

The novel polymers comprising N-cycloalkyl norbornene dicarboximide of this invention are advantageously prepared by well known metathesis ring-opening polymerization techniques, including melt polymerization and solution polymerization where the monomer is dissolved in solvents such as toluene or dichloroethane. Polymers of this invention comprise homopolymers of N-cycloalkyl norbornene dicarboximides and copolymers with other norbornene derivative monomers, e.g. norbornene nitrile or preferably a norbornene dicarboximide such as N-methyl, N-trifluro ethyl, or N-phenyl norbornene dicarboximide.

The Tg of the polymers of this invention, as determined by differential scanning calorimeter (DSC), is preferably at least 180° C. Depending on the cycloalkyl radical of the imide group the Tg of homopolymers of N-cycloalkyl norbornene dicarboximides can range from about 180° C. for homopolymers of cyclobutyl and cyclopentyl imides, to about 190° C. for homopolymers of the cyclopropyl imide and greater than 205° C. for the homopolymers of cyclohexyl, cycloheptyl and cyclooctyl imides. Because of their higher Tg's the homopolymers of the 6–8 carbon atom cycloalkyl norbornene dicarboximides are preferred; most preferred is the homopolymer of the cyclohexyl imide.

Because the N-cycloalkyl norbornene dicarboximide monomers have a sufficiently low melt point, the polymers of this invention are advantageously prepared by melt polymerization, e.g. in an extruder, using conventional metathesis polymerization catalyst systems, such as tungsten hexachloride catalyst with aluminum alkyl initiator. Preferred catalyst systems are the non-pyrophoric catalysts, such as comprising ruthenium initiator and tungsten catalyst, disclosed by Hardiman in U.S. application Ser. No. 07/531,663, incorporated herein by reference.

The preferred polymers of this invention will exhibit desirably low dielectric constant, e.g. less than 3 when measured over a wide range of frequency, e.g. 0.1-100 kilohertz, at 25° C. and 50% relative humidity. Permittivity reported herein was typically measured at 1000 hertz. More preferably the permittivity will be less than 2.8. Especially preferred polymers of the N-cyclohexyl imide exhibit a dielectric permittivity of about 2.5; e.g. about 2.4 as molded and 2.6 after equilibration in room temperature air 50% relative humidity.

The polymers of this invention exhibit low moisture absorption, e.g. less than 2.5% weight increase after equilibrating in boiling water. Preferred homopolymers of the N-cyclohexyl imide exhibit about 2% weight increase after equilibrating in boiling water.

In the case of copolymers of this invention the monomer units are selected to provide a desired balance of properties. For instance, since polymers of norbornene nitrile have a Tg of about 124° C., copolymers of norbornene nitrile with an N-cycloalkyl norbornene dicarboximide will typically exhibit lower Tg in proportion to the amount of norbornene nitrile units. for instance, a polymer containing as little as 20% norbornene nitrile units and 80% N-cyclohexyl norbornene dicarboximide units has a Tg of 173° C.

A preferred copolymer comprises monomer units of N-methyl norbornene dicarboximide or N-trifluoroethyl norbornene dicarboximide. For instance, because homopolymers of N-methyl norbornene dicarboximide exhibit high Tg of about 210° C. and dielectric permittivity of about 3.1, copolymers of N-methyl and N-cyclohexyl norbornene dicarboximides will have a Tg of at least 205° C. and a dielectric permittivity between 2.5 and 3 depending on the proportion of monomer units.

Copolymers of N-methyl and N-cycloalkyl norbornene dicarboximide are advantageously prepared by melt polymerization at temperatures lower than the melting point of either monomer, i.e. about 115° C. for N-methyl norbornene dicarboximide and about 140° C. for N-cyclohexyl norbornene dicarboximide. For instance, monomer mixtures of about 25-70% N-cyclohexyl norbornene dicarboximide melt at temperatures of 85°-100° C. and monomer mixtures of about 50-60% N-cyclohexyl norbornene dicarboximide melt at eutectic temperatures of 85°-90° C. Such melt polymerization conducted at lower temperatures reduces the polymer's exposure to the potentially deleterious effects of higher temperature polymerization. Thus, another aspect of this invention comprises copolymers of an N-cycloalkyl norbornene dicarboximide monomer and one or more other norbornene derivative monomers. Such copolymers prepared by melt polymerization of a mixture of N-methyl and N-cyclohexyl norbornene dicarboximide monomers having a depressed melting point, e.g. at less than 100° C., exhibit the advantageous qualities of high heat resistance (i.e. Tg of at least 205° C. and dielectric permittivity less than 3 and moisture absorption less than that of homopolymers of the N-methyl imide.

The norbornene dicarboximide monomers are advantageously derived from monomers of norbornene dicarboxylic acids. Such monomers are readily prepared through Diels-Alder reaction of cyclopentadiene and maleic anhydride by methods that are well known, e.g. as disclosed in U.S. Pat. No. 4,022,954, incorporated herein by reference. In general the Diels-Alder reaction product of cyclopentadiene and maleic anhydride is the endo stereoisomer. This endo stereoisomer can be converted to a predominately exo stereoisomer by heating and recrystallization, e.g. by well-known procedures such as disclosed by Castner et al. in *Journal of Molecular Catalysis* 15, (1982) 47-59. For instance, in the case of norbornene dicarboxylic anhydride heating at about 198° C. for about two hours provides a molten equilibrium mixture of about 45 percent endo stereoisomer and about 55 percent exo stereoisomer. Predominately exo stereoisomer of NDA can be recovered by selective crystallization from a solvent such as toluene. Through multiple recrystallizations substantially high levels of the exo stereoisomer can be recovered, e.g. at least about 85 percent or higher. The dicarboximides can be prepared by reacting a primary amine, e.g. cyclohexylamine, with the norbornene dicarboxylic anhydride providing an amic acid which can be readily imidized.

The polymers and copolymers of this invention are advantageously useful for preparing molded parts intended for high service temperature applications e.g. above 150° C. Owing to the low dielectric permittivity of these materials, an especially advantageous application is in electronic devices such as molded circuit boards, integrated circuit substrates, connectors, capacitors and the like. The disclosure in the following examples illustrate specific embodiments and aspects of this invention but is not intended to imply any limitation of the scope of this invention.

EXAMPLE 1

This example illustrates the preparation of a polymer of a N-cyclohexyl norbornene dicarboximide.

2 g of substantially exo-stereoisomeric N-cyclohexyl norbornene dicarboximide, melting point of 135°-140° C., was dissolved in toluene at 65° C. providing a solution containing 30 wt. % monomer. The solution was mixed with 0.1 ml of a catalyst solution comprising 0.5 M tunsten hexachloride in toluene and and 0.2 ml of an activator solution comprising 2 M diethyl aluminum chloride in heptane. After mixing for about 1.5 hours the polymerization reaction was stopped by admixture of methanol. The recovered reaction product of poly(N-cyclohexyl norbornene dicarboximide) had a molecular weight of 58.5 K (number average) and 421 K (weight average), a Tg of 208° C. (by DSC), a dielectric permittivity of 2.55 and equilibrated boiling water uptake of 2%.

EXAMPLE 2

This example illustrates the preparation of a polymer of a N-cyclohexyl norbornene dicarboximide.

The procedure of example 1 was essentially repeated except the toluene solvent was replaced with 1,2-dichloroethane. The resulting polymer exhibited a molecular weight of 36 K (number average) and 90 K (weight average), a Tg of 207° C. (by DSC) and equilibrated boiling water uptake of 2%.

EXAMPLE 3

This example illustrates the preparation of a polymer of a N-cyclohexyl norbornene dicarboximide.

2 g of substantially exo-stereoisomeric N-cyclohexyl norbornene dicarboximide was mixed in a melt at 140° C. with 0.1 ml of a catalyst solution of 0.5 M tungsten hexachloride and 0.2 ml of an activator solution of 2 M diethyl aluminum chloride for about 1.5 hours producing a polymer recovered in methanol having molecular weights of 62 K (number average) and 1290 K (weight average), a Tg of 209° C. (by DSC), a dielectric permittivity of 2.55 and equilibrated boiling water uptake of 2%.

EXAMPLE 4

This example illustrates the preparation of polymers of N-cyclohexyl norbornene dicarboximide.

Endo stereoisomeric N-cyclohexyl norbornene dicarboximide was added to the exo-stereoisomeric monomer in the amount indicated in Table 1 and the mixture was polymerized essentially in the manner of Example 1. Polymerization yield and Tg for the resulting polymers is indicated in Table 1.

TABLE 1

| Endo Isomer In Monomer Mix | Endo Isomer In Polymer | Conversion | Tg |
|---|---|---|---|
| 0 | 0 | 100% | 208° C. |
| 10 | 10 | 95 | 207 |
| 20 | 11 | 90 | 210 |
| 30 | 18 | 80 | 216 |
| 40 | — | 67 | 218 |
| 50 | — | 40 | 215 |
| 60 | — | 28 | — |

EXAMPLE 5

This example illustrates the preparation of copolymer of N-cyclohexyl and N-methyl norbornene dicarboximide by melt polymerization and solution polymerization.

A 50/50 mixture by weight of N-cyclohexyl and N-methyl norbornene dicarboximides has a eutectic melting point of about 85° C. Polymers prepared by melt polymerization essentially in the manner of Example 3 provided copolymers typically having a molecular weight of about 40 K (number average) and 200 K (weight average) and a Tg of about 208° C.

Mixtures of N-cyclohexyl and N-methyl norbornene dicarboximides were polymerized in toluene solutions using catalyst and initiator solutions essentially according to the procedure of example 1. Copolymers were prepared having 20, 40, 50, 60 and 80 mole percent N-cyclo hexyl norbornene dicarboximide units having a Tg of about 209° C. and molecular weights in the range of 36–50 (number average) and 150–420 (weight average).

EXAMPLE 6

This example illustrates polymers of a variety of N-cyclo alkyl norbornene dicarboximides.

N-cyclopropyl, N-cyclobutyl, N-cyclopentyl, N-cycloheptyl and N-cyclooctyl norbornene dicarboximides were polymerized essentially in the manner of Example 1 providing polymers having Tg (by DSC) of 191, 182, 180, 204 and 208, respectively.

EXAMPLE 7

This example illustrates the effect of molecular weight on Tg of polymers of N-cyclohexyl norbornene dicarboximide.

N-cyclohexyl norbornene dicarboximide was polymerized essentially in the manner of Example 1 except that varying amounts of 1-hexene was added as a polymer chain terminator. The results indicate a correlation between number average molecular weight

TABLE 2

| Number Average Molecular Weight | Tg |
|---|---|
| 93K | 208° C. |
| 48 | 209 |
| 30 | 209 |
| 15.2 | 200 |
| 15.0 | 194 |
| 11.9 | 192 |
| 10.6 | 191 |
| 7.9 | 185 |
| 6.2 | 172 |
| 5.8 | 170 |

EXAMPLE 8

This example illustrates the preparation of a copolymer of N-cyclohexyl norbornene dicarboximide and N-trifluoroethyl norbornene dicarboximide.

9 parts of N-cyclohexyl norbornene dicarboximide and 1 part N-trifluoroethyl norbornene dicarboximide were polymerized essentially in the manner of Example 3 providing a copolymer having a permittivity of 2.2.

While specific embodiments have been described, it should be apparent to those skilled in the art that various modifications thereof can be made without departing from the true spirit and scope of the invention. Accordingly, it is intended that the following claims cover all such modifications within the full inventive concept.

What is claimed is:

1. A polymer comprising N-cycloalkyl norbornene dicarboximide units wherein said cycloalkyl ranges from cyclopropyl to cyclooctyl, wherein said polymer has a glass transition temperature of at least 180° C.

2. A polymer according to claim 1 consisting of poly(N-cyclohexyl norbornene dicarboximide).

3. A polymer according to claim 1 wherein said polymer exhibits a dielectric permittivity less than 2.8 at 1000 hertz in air at 25° C. and 50% relative humidity.

4. A polymer according to claim 3 consisting of poly(N-cyclohexyl norbornene dicarboximide).

5. A polymer according to claim 1 wherein said polymer exhibits moisture absorption after equilibrating in boiling water of less than 2.5%.

6. A polymer according to claim 5 consisting of poly (N-cyclohexyl norbornene dicarboximide).

7. A polymer according to claim 1 prepared by melt polymerization wherein molten N-cycloalkyl norbornene dicarboximide monomer is mixed in an extruder with metathesis ring-opening polymerization catalyst at a temperature less than 150° C.

8. A method of preparing a polymer comprising N-cycloalkyl norbornene dicarboximide units wherein said cycloalkyl ranges from cyclopropyl to cyclooctyl and wherein said polymer has a glass transition temperature of at least 180° C, said process comprising mixing in an extruder molten N-cycloalkyl norbornene dicarboximide and metathesis ring-opening polymerization catalyst at a temperature less than 150° C.

* * * * *